Nov. 29, 1955  W. L. BARROW  2,725,533
BRIDGE CIRCUIT EMBODYING ARTIFICAL TRANSMISSION LINES
Original Filed Jan. 25, 1947

INVENTOR
WILMER L. BARROW
BY
Thomas M. Ferrill, Jr.
ATTORNEY

United States Patent Office 2,725,533
Patented Nov. 29, 1955

2,725,533

BRIDGE CIRCUIT EMBODYING ARTIFICIAL TRANSMISSION LINES

Wilmer L. Barrow, Manhasset, N. Y.

Original application January 25, 1947, Serial No. 724,390. Divided and this application December 18, 1953, Serial No. 398,933

11 Claims. (Cl. 333—11)

This invention relates to high-frequency transmission line bridge circuits, and in particular to bridge circuits in which artificial transmission lines are essential elements. The present applicaiton is a division of my copending application Serial No. 724,390, filed January 25, 1947, now Patent 2,666,132, which is a continuation-in-part of my application Serial No. 376,253, filed January 28, 1941, now Patent No. 2,416,790.

The difficulties encountered in extending the use of conventional bridge circuits to high frequencies are due to complications and uncertainties which arise and which increase rapidly with increasing frequency. For example, as applied to the measurement of impedance, the use of bridge circuits at high frequencies is adversely affected by the impedance and calibration of the indicating instrument, by the effect of leads to auxiliary equipment and similar factors which vary with frequency, so that the useful frequency range of a given piece of equipment is usually very limited. In addition, conventional circuits do not provide true equivalents of bridge circuits at high frequencies in many applications where it is desirable to take advantage of the characteristics of a bridge connection.

My improved circuit making use of transmission lines as bridge elements among other advantages provides the complete equivalent of a bridge. In the form adapted for making impedance measurements, the impedance of the indicating instrument and its calibration do not enter into the precision of the measurement.

The term "transmission line" as used herein in its narrow sense refers to any means for guiding electromagnetic waves which provides a restricted path having distributed electrical constants, but it also has a wider meaning which includes in addition, lumped impedance artificial transmission lines having propagation characteristics similar to those of actual transmission lines.

In accordance with the present invention there is introduced a bridge circuit specifically employing lumped impedance artificial transmission lines as arms of the bridge with impedance elements coupled to the artificial transmission lines at the bridge points thereof.

An object of the present invention is to provide an improved bridge circuit for use at high frequencies.

Another object is to provide an artificial transmission line bridge circuit suitable for operation at high frequencies having the same general characteristics as conjugate circuit devices commonly used at low frequencies, such as hybrid coils.

Yet another object is to provide a bridge circuit employing artificial transmission lines having lumped-impedance circuit elements simulating a distributed-constant transmission line for making impedance measurements at high frequencies.

The above objects of and the brief introduction to the present invention will be more fully understood, and further objects and advantages will become apparent from a careful study of the following description in connection with the drawings, wherein, Fig. 1 is a generalized circuit diagram illustrating the connection of four transmission lines in a bridge arrangement with four lumped impedances at the bridge points;

Figure 1:
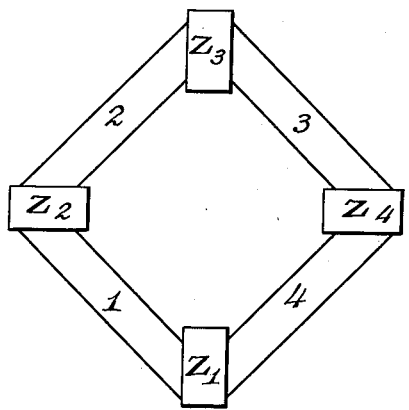

Referring to Fig. 1, there is shown a basic diagram of a generalized bridge circuit composed of four transmission lines 1, 2, 3, 4 arranged in tandem to form a closed loop with a lumped impedance connected between each pair of adjacent lines. These bridge point impedances Z1, Z2, Z3, and Z4 may take any form of single elements or combinations of elements, and may be the impedances of apparatus units, for example, generators or meters. In employing the bridge circuit for the measurement of impedance at high frequencies, one of the bridge point impedance elements includes a source of high frequency energy, and the opposite bridge point impedance element includes an indicator. The bridge is operated as a symmetrical balanced circuit with the source connected in shunt and the indicator coupled in series at their respective bridge points, or the indicator connected in shunt and the source connected in series at their respective bridge points.

Figure 2:
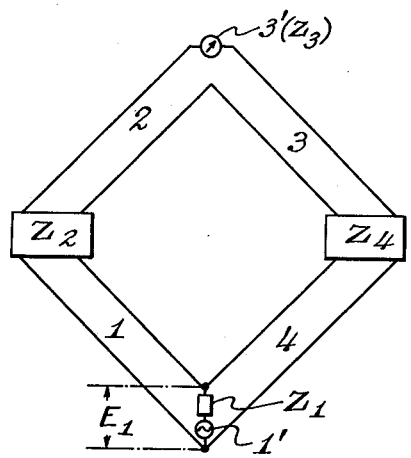
Fig. 2 illustrates a transmission line bridge circuit having a shunt-connected source and a series-connected indicator.

For example, Fig. 2 shows a bridge circuit version in which a high frequency E. M. F. $E_1$ is supplied to the circuit by a source having an impedance Z1, which may be the internal impedance of a generator or source 1'. An indicator 3' having an impedance Z3 is connected in series at the opposite bridge point. Ignoring for the moment the two impedances Z2 and Z4, it may be considered that the four transmission lines 1, 2, 3 and 4 form a pair of separate transmission paths 1, 2 and 4, 3 between high-frequency source 1' and indicator 3'. If the source impresses the voltage $E_1$ across lines 1 and 4, electromagnetic waves will travel along both paths and supply two alternating voltages to the impedance Z3 of the indicator. Assuming that the lines have similar transmission characteristics and lengths, the two alternating voltages supplied to the impedance Z3 will have the same amplitude and phase. The net voltage difference impressed across the series-connected indicator will, therefore, be zero. The circuit is balanced in the sense that an ordinary bridge network is balanced since a voltage applied to one pair of terminals is incapable of producing any voltage across a second or conjugate pair of terminals.

The insertion of equal impedances Z2 and Z4, respectively, at corresponding points in the two paths 1, 2 and 4, 3 of Fig. 2 changes the magnitudes of the voltages at Z3 by the same amounts but not their relative phase. Thus, in using the circuit of Fig. 2 for making impedance measurements by a null method, a null indication on indicator 3' shows that the impedance to be measured, for example, Z2, is equal to a standard impedance, for example Z4. Since a current node exists at the position of indicator 3' when equal transmission paths 1, 2 and 4, 3 are provided, indicator 3' will read zero when Z2 equals Z4, thus providing a method of measuring Z2 when Z4 is known or calibrated.

The impedances Z2 and Z4 may take a variety of forms including known forms of networks. Different types of suitable networks are shown and described in the aforesaid Patent 2,416,790. It is to be understood that any impedance element may itself be a complex impedance made up of resistive and reactive components.

Figure 3:
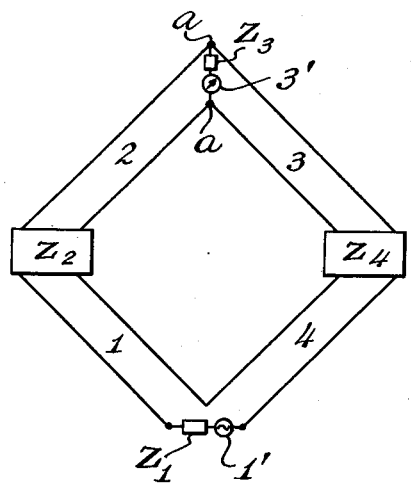
Fig. 3 illustrates a transmission line bridge circuit having a series-connected source and a shunt-connected indicator.

If all circuit elements are linear and bilateral, the generator and indicator (or any receiver taking the place of the indicator) are interchangeable. Thus, the embodiment of Fig. 3 shows a series-connected source 1' and a shunt-connected indicator 3'. Indicator 3' furnishes zero indication when the impedances Z2 and Z4 are equal, it being understood that in this case the two transmission line paths 1, 2 and 4, 3 connecting 1' and 3' also have the same transmission characteristics. The impedance of neither source nor indicator affects this relationship. Of particular importance is the fact that the meter may have a low impedance and that it requires no calibration either for linearity or voltage. Furthermore, the balance may be made at any frequency provided only that the lines are long enough to function as transmission lines at that frequency.

By the well-known Reciprocity Theorem (see Terman's "Radio Engineers' Handbook," 1943, McGraw-Hill Book Co., page 198) in any linear network the interchanging of a source and a load does not affect the current flowing through (or the voltage across) the load. Hence, by interchanging source 1' and indicator 3' of Fig. 2 to obtain the bridge of Fig. 3, operation is unchanged, and the circuit of Fig. 3 may be used as a balanced bridge as described above in connection with Fig. 2.

Figure 4:
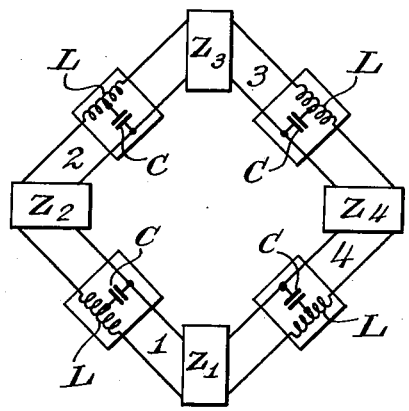
Fig. 4 illustrates the present invention of a bridge circuit utilizing artificial transmission lines in place of transmission lines having distributed constants.

My present invention provides bridge circuits in which there are substituted for transmission lines having distributed constants, simulated lines composed of lumped impedances. Such a bridge circuit comprising artificial lines is shown in Fig. 4. In general, to simulate actual lines artificial lines will have series resistance and inductance, and shunt capacitance and conductance, although the relative importance of these several factors varies with the frequency range for which the apparatus is designed, and one or more of them may be omitted in some applications. In the circuit of Fig. 4 series inductance L and shunt capacitance C only are shown.

The artificial transmission line bridge circuit of Fig. 4 may be used as a symmetrically balanced circuit employing a source of high frequency energy at one bridge point and an indicator coupled at the opposite bridge point for measuring impedance in the same manner in which the transmission line bridge circuit of Fig. 1 is used to measure impedance as described in connection with Figs. 2 and 3. Moreover, in any of the embodiments of my inventions described in the aforesaid application Serial No. 724,390, now Patent 2,666,132, and in Patent 2,416,790, the indicated transmission lines 1, 2, 3 and 4 may be replaced by an artificial line having lumped-impedance circuit elements and simulating in well-known manner a distributed-constant transmission line.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A bridge type network comprising four artificial transmission lines composed of series inductors and shunt capacitors connected as the arms thereof, said artificial transmission lines having substantially identical attenuation and phase shift characteristics, and four impedance elements, one of said impedance elements being connected to said artificial transmission lines at each of the four bridge points of said network, one of said elements being series connected and the element opposite said series-connected element being shunt connected.

2. A circuit network comprising a pair of transmission paths including artificial transmission lines composed of lumped impedances, an alternating current source, and an alternating current energy-receiving device, one of said latter two elements being connected in shunt to the inputs of both said transmission paths, the other of said two elements being serially connected between the outputs of said transmission paths, said circuit network forming a balanced bridge when the attenuation and phase shift characteristics of said pair of transmission paths are substantially identical, said alternating current energy-receiving device being responsive to the difference between the alternating current signals at the output of said transmission paths.

3. A bridge type network comprising four artificial transmission lines composed of series inductors and shunt capacitors connected as the arms thereof, an alternating current source shunt connected to a pair of said artificial transmission lines at one bridge point of said network, an indicator series connected between a pair of said artificial transmission lines at the opposite bridge point thereof, and impedance means coupled to said artificial transmission lines at the remaining bridge points thereof.

4. The bridge-type network as defined in claim 3, wherein said impedance means coupled to said artificial transmission lines at the remaining bridge points thereof possess substantially equal impedance values thereby forming a balanced bridge, said series-connected indicator thereby being non-responsive to said shunt-connected alternating current source.

5. An arrangement for coupling four wave transmission media in a wave transmission system comprising a closed transmission loop consisting of four coupled loop portions with lumped circuit constants equivalent to a section of transmission line of predetermined wavelength, means for electrically connecting said wave transmission media as branches to said loop at respectively different junctions of the four loop portions, at least one of said branches being connected electrically in series with said loop, the types of electrical connection of the other branches to said loop being selected and the characteristic impedances of the four branches with respect to that of said loop and the lumped circuit constants of the four coupled loop portions being proportioned so as to substantially prevent wave transmission at certain frequencies between the transmission branch connected to each loop junction and the transmission branch connected to the oppositely situated loop junction, and to enable efficient wave transmission at said certain frequencies between the transmission branch connected to each loop junction and the two transmission branches connected to the next adjacent loop junctions around the loop.

6. A coupling arrangement for use in a wave transmission system, comprising a closed transmission loop having lumped circuit constants equivalent to a section of transmission line of predetermined wavelength, and four branch circuits electrically connected to said loop at respectively different points, at least one of said branch circuits being connected electrically in series with said loop and at least one other of said branch circuits being connected electrically in parallel therewith, the types of electrical connections of the other branch circuits to said loop being selected and the lumped circuit constants of the portions of the loop connecting the adjacent branch circuits being relatively proportioned so as to provide a high degree of electrical balance, at least for waves of certain frequencies, between each two branch circuits connected to oppositely situated points in said loop and a substantial amount of electrical unbalance between each branch circuit and each of the two next adjacent branch circuits around said loop.

7. A duplex balancer comprising a closed transmission loop having four coupled loop portions with lumped circuit constants equivalent to a section of transmission line of predetermined wavelength, and four branch circuits respectively connected to the loop at a different one of the four junctions of the coupled loop portions, electrical balance at least at certain frequencies between each two branch circuits connected at oppositely situated loop junctions and electrical unbalance at said certain frequencies between the branch circuits connected at each two adjacent junctions around the loop, being achieved mainly by the use of a parallel and a series electrical connection, respectively, with the loop for at least two of the branch circuits connected at oppositely situated loop junctions.

8. The duplex balancer of claim 7, in which the branch circuits at two oppositely situated loop junctions are both connected to the loop by a series electrical connection.

9. The duplex balancer of claim 7, in which the branch circuits at two oppositely situated loop junctions are both connected to the loop by a parallel electrical connection.

10. A high frequency bridge circuit comprising four symmetrically positioned impedance elements and four impedance networks adapted to simulate transmission lines at frequencies within the operating range, said impedance networks having substantially identical transmission characteristics, the aforesaid circuit elements being connected to form a closed loop in which said impedance elements and said artificial lines alternate, one of said impedance elements being coupled in series between adjacent lines, and the impedance element opposite said series connected impedance element being coupled in shunt across adjacent lines.

11. A bridge circuit as defined in claim 10, further comprising a source of alternating voltage coupled to said shunt connected impedance element for impressing a potential thereacross.

References Cited in the file of this patent

UNITED STATES PATENTS

| | | |
|---|---|---|
| 1,658,740 | Rice | Feb. 7, 1928 |
| 2,035,536 | Cowan et al. | Nov. 31, 1936 |
| 2,147,809 | Alford | Feb. 21, 1939 |
| 2,157,523 | Bushbeck | May 9, 1939 |